United States Patent [19]

Niwa et al.

[11] 4,442,129
[45] Apr. 10, 1984

[54] PROCESS FOR SEALING GLASS CONTAINER OPENINGS

[75] Inventors: Susumu Niwa, Wako; Masao Koike, Sakura, both of Japan

[73] Assignee: Kabushiki Kaisha Hosokawa Yoko, Tokyo, Japan

[21] Appl. No.: 342,705

[22] Filed: Jan. 25, 1982

[30] Foreign Application Priority Data

Jul. 20, 1981 [JP] Japan ................................ 56-112119

[51] Int. Cl.$^3$ ............................................. B65B 7/28
[52] U.S. Cl. ..................................... 426/399; 53/478; 156/69; 156/82; 156/321; 156/583.3; 215/232; 215/347; 215/349; 215/DIG. 2; 426/397; 428/35; 428/349
[58] Field of Search ..................... 53/478; 156/69, 82, 156/321, 322, 583.3; 215/232, DIG. 2, 347, 349; 426/397, 399; 428/35, 349

[56] References Cited

U.S. PATENT DOCUMENTS

| 4,095,390 | 6/1978 | Knudsen | 156/69 X |
| 4,222,974 | 9/1980 | Smith | 156/69 X |
| 4,260,438 | 4/1981 | Dembicki et al. | 156/322 X |
| 4,297,161 | 10/1981 | Graffin | 53/478 X |
| 4,390,552 | 6/1983 | Niwa | 426/126 |

Primary Examiner—Robert A. Dawson
Attorney, Agent, or Firm—Wenderoth, Lind & Ponack

[57] ABSTRACT

In the sealing of a glass container containing a product such as a food product by means of a cover comprising a metal foil having on one surface thereof a sealant layer of a thermoplastic resin, the opening end of the container is preheated, and the cover is placed on the opening end, after which the cover is pressed against the opening end successively by a heating plate and a separate pressing plate. By this process, a positive seal and a high sealing process efficiency are obtained even when the container content is a product such as a heated liquid food product and even when the rim surface of the opening end of the container has some projecting irregularities.

10 Claims, 8 Drawing Figures

PROCESS FOR SEALING GLASS CONTAINER OPENINGS

BACKGROUND OF THE INVENTION

This invention relates generally to sealing of openings of vessels and containers and more particularly to a process for affixing cover materials in sealed state onto the opening rims of glass containers.

It is a general practice to place a powder material such as coffee or a dry dairy product in a glass container such as a jar and to affix a cover material comprising a piece of metal foil and a resin layer formed on a surface thereof onto the rim of the container opening thereby to seal the powder material in the container.

For affixing the cover material in sealed state onto the opening rim of the glass container, the induction sealing process has heretofore been widely used.

This induction sealing process comprises causing each of a plurality of glass containers on the opening rim surface of which a cover material (hereinafter referred to as "cover") has been placed to pass through a region where it is exposed to high-frequency electromagnetic waves thereby to cause its resin layer to be heated by its self-induced heat, whereby the resin layer is melted and caused to adhere to the opening rim surface. A capping machine carrying out such an induction sealing process is capable of high-speed operation of sealing approximately 500 containers per minute and is therefore being utilized for sealing products such as powdery or solid food products other than food products in liquid form.

However, it has heretofore been impossible to carry out satisfactory sealing of liquid products by this induction sealing process. The reason for this is that, since a liquid product is sterilized by heating and charged into glass containers at high temperature, and the vapor pressure of the food product or the like in the glass container gives an interior pressure of the container at the time of sealing and exerts a force tending to cause the heat-sealed part of the cover to separate from the container rim surface immediately after sealing, thereby giving rise to instability of the adhesive or bonding strength of the sealed parts.

Another process for affixing a cover is the heat-sealing process wherein a cover is heated by means of a heating plate and thereby caused to be affixed by heat adhesion to the opening rim surface of a glass container.

However, in general, the heat capacity of a glass container is great, and the cover cannot be caused to adhere positively to the opening rim surface merely by applying heat to the cover from the heating plate including the heat transmitted to the glass container. Particularly in the case of most glass containers, each container is formed into an integral structure by joining together two halves thereof, and in many cases projections of the order of 0.2 to 0.3 mm exist on the opening rim surface in the vicinity of the joint between the container halves. The presence of these projections impairs the adhesion given by heating and pressure application.

In the case of a cover, such as an intermediate or inner cover of a container, which comprises a thin metal foil of a thickness of the order of 100 microns or less and a sealant layer also of a thickness of the order of 100 microns or less laminated onto the foil, projections of this character on the opening rim surface of the container cannot be absorbed by the cover, whereby portions where the applied force is locally not transmitted are created. This defective state can be corrected by providing a cushioning layer of a material such as rubber of a thickness of the order of 2 to 5 mm on the contacting surface of the heating plate, but a presence of such a cushioning layer, itself, obstructs the transmission of heat from the heating plate to the cover. Therefore, the heat-sealing process is still not a satisfactory process on the points of adhesive strength and work efficiency and has not yet been reduced to effective practice.

SUMMARY OF THE INVENTION

It is an object of this invention to provide a process for heat sealing glass containers which process affords much improved seal strength and work efficiency.

More specifically, an object of this invention is to provide a process for affixing covers on glass containers by which a cover can be affixed in positively sealed state on each glass container even in the case where the ccontainer is filled with a liquid product, and by which, moreover, the cover can be sealed by a heat-sealing process.

As a result of our studies carried out with the above objects, we have learned that, in a sealing process with a heating plate which has the desirable feature that sealing can be carried out as pressure is applied for sealing a container containing a liquid product, positive seals can be obtained with high work efficiency by an effective combination of heating, heat removal, and pressure application. The process for sealing glass containers with covers of this invention is based on this finding.

According to this invention, briefly summarized, there is provided a process for affixing covers onto glass containers which comprises the steps of: (a) providing a glass container having an opening end; (b) providing a cover comprising a piece of metal foil having a shape suitable for covering the opening end and a sealant layer of a thermoplastic resin laminated onto one surface of the metal foil; (c) preheating the opening end; (d) placing the cover on the opening end so that the sealant layer contacts the opening end; (e) pressing the cover, as it is heated, against the opening end by means of a heating plate thereby to cause the cover to adhere to the opening end; and (f) pressing the cover against the opening end by means of a pressing plate at a temperature lower than that of the heating plate in step (e) thereby to assure positive sealing of the opening end by the cover.

In the practice of this invention, since the container opening end is heated beforehand, the heat-seal surface of the cover to contact the container opening end, the heating of which heat-seal surface is considered to be necessary, is heated preferentially at the time of heating and pressing of the cover by means of a heating plate, and the heating step as a whole becomes rapid. Furthermore, since the supplying of heat by the heating plate and the subsequent pressing action by the pressing plate are separated, the heating and cooling in the sealing process become rapid as almost all of this process is carried out while pressure is being applied, and a positive seal is quickly obtained.

In the case where there are projections on the opening rim surface of the container as mentioned hereinbefore, also, such projections can be easily absorbed by providing cushioning layers on the heating plate and the pressing plate. That is, since only the supplying of heat need be considered in the case of the heating plate, it is not necessary to make the thermal inertia of the heating plate very small (i.e., to make the thermal response of the heating plate very good) as in the case where positive sealing is obtained by cooling the heating plate while pressure is being applied by the heating plate. Accordingly, there is not a very great adverse effect in providing a cushioning layer of a thickness of a certain extent on the heating plate, and, if necessary, by narrowing the object to supplying heat, it is also possible to omit the cushioning layer.

On the other hand, in the case of the pressing plate, a cushioning layer of ample thickness can be provided since there is no problem of supplying heat. Thus, by the practice of the process of this invention, a high work efficiency of the entire process and high seal strength can be obtained.

The nature, utility, and further features of this invention will be more clearly apparent from the following detailed description, including a specific example of practice, when read in conjunction with the accompanying drawing briefly described below.

DETAILED DESCRIPTION OF THE INVENTION

Figure 1:
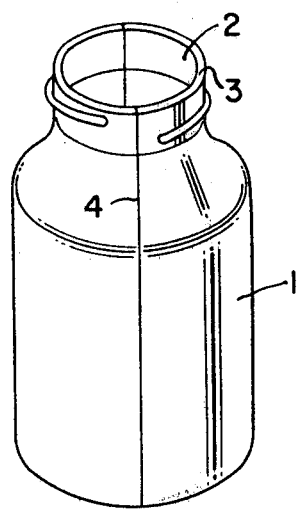
FIG. 1 is a perspective view of one example of a glass container to be sealed by the process of this invention.

One example of a glass container to which this invention can be applied is a wide-mouth bottle or jar as shown in FIG. 1. This container 1 has an opening 2 encompassed by a rim surface 3. Particularly in the case where this container 1 has been formed by joining together two halves of the bottle, bead-like projections of a height of approximately 0.2 to 0.3 mm tend to be formed on this rim surface 3 in the vicinity of the joint seam where the bottle halves are joined.

Figure 2:
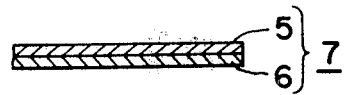
FIGS. 2 and 4 are sections taken along planes in the thickness direction respectively showing examples of covers used in accordance with the invention.
Figure 4:
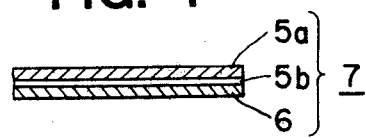

The opening rim surface 3 of this glass container 1 is sealed according to this invention by a cover 7 as shown in FIG. 2, which is prepared by forming a sealant layer 6 of a thermoplastic resin by a process such as hot-melt deposition or extrusion lamination on one surface of a metal foil 5 of a thickness of, for example, 20 to 100 microns. As the thermoplastic resin for forming the sealant layer 6, any resin known as a so-called hot-melt type adhesive, such as polyethylene, an ethylene/vinyl acetate copolymer (EVA) or a partially saponified EVA can be used.

In the case where a sealant having good adhesiveness while being capable of withstanding filling under heating of the container with a water-containing content is required, however, it is preferable to use a graft copolymer having a 20 to 60% saponification product of an ethylene/vinyl acetate copolymer (EVA) of a vinyl acetate content of 15 to 45% by weight as a trunk polymer and a polymer of an unsaturated carboxylic acid in a quantity of 0.1 to 10% by weight of the partially saponified EVA as a branch polymer. A heat-sealing sheet material having a sealant layer comprising such a graft copolymer is per se, the subject matter of a patent application filed concurrently (entitled "Heat-Sealing Sheet Material"; inventor: Susumu Niwa); said application being assigned Ser. No. 342,704, filed Jan. 25, 1982 and is now U.S. Pat. No. 4,390,552. The disclosure of this concurrent application is intended to be included herein by reference.

While, in general, the suitable heat-sealing temperature differs with the kind of the sealant resin, it is within the range of approximately 230° to 350° C. in terms of the surface temperature of a heating plate to be applied thereto.

Figure 3A:
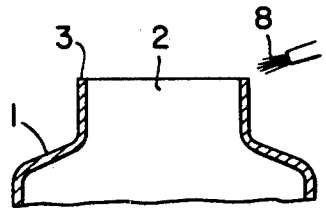
FIGS. 3a through 3e are elevational views, in vertical section, showing the region around the opening of a glass container for a description of steps in the process of the invention.

In the process of this invention, the opening rim surface 3 to become the adhesion surface on the side of the glass container 1 is preheated to a temperature of 40° to 90° C., preferably 70° C.±5° C. by means 8 such as a flame, heated air stream, or a heating plate (all not shown) as indicated in FIG. 3a. This preheating is particularly effective when a heated liquid material has been charged into the container since it eliminates dewing of vapor thereby to enhance the adhesion with a cover. In the case where a heating plate is to be used for this preheating, it is preferable to use an additional heating plate separate from that used for heat sealing, as described hereinafter, thereby to shorten the entire process cycle.

Figure 3B:
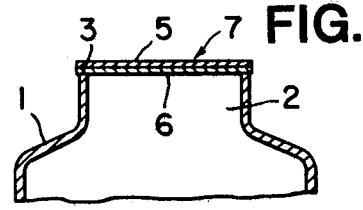

Next, as indicated in FIG. 3b, a cover 7 as described hereinbefore is so placed on the glass container opening so that its sealant layer 6 contacts the opening rim surface 3.

Figure 3C:
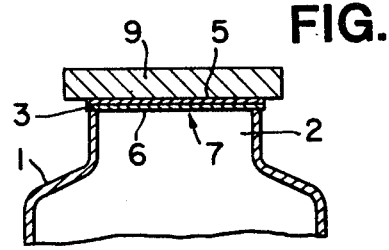

Then, as indicated in FIG. 3c, the cover 7 is pressed against the rim surface 3 by means of a heating plate 9. At the same time, the cover 7 is heated to the optimum temperature for heat adhesion according to the material characteristic of the resin layer 6 to cause it to adhere under heating to the rim surface 3, thereby carrying out heat sealing. More specifically, a heating plate with a temperature of, for example, 230° to 350° C. is used. In the practice of this invention, the principal function of the heating plate 9 is to supply heat to the sealant layer 6, and the completion of the sealing procedure is carried out in the succeeding step. Accordingly, the upper limit of the temperature of the heating plate 9 need not be set very strictly, and it is possible to use a temperature exceeding the optimum temperature range.

Since the opening rim surface 3 of the glass container 1 has been preheated in this heat-sealing process, there is no possibility of inadequate heating by the heating plate 9, and good adhesion of the cover 7 to the rim surface 3 can be achieved. Furthermore, since the sealing is accomplished as the cover 7 is pressed against the rim surface 3, even when the content within the glass container 1 is a fluid substance and is in a highly pressurized state after high-temperature sterilization, heat adhesion can be accomplished as turning up of the peripheral lip of the cover 7 is suppressed, whereby a good seal can be obtained.

Figure 3D:

Furthermore, by providing a thin elastic layer 10 made of a material such as a rubber of a thickness of the order of 2 to 10 mm underneath the lower surface of the heating plate 9 as shown in FIG. 3d and pressing and heating the cover 7 over this elastic layer 10 interposed therebetween, the aforementioned projections of a height of the order of 0.3 mm on the opening rim surface 3 of the glass container 1 are absorbed, whereby the cover 7 can be caused to adhere intimately and firmly against the rim surface 3, and an even more positive heat sealing can be achieved. Since the material forming this elastic layer 10 generally has a poor heat-transmitting characteristic, it is desirably made as thin as possible.

Figure 3E:
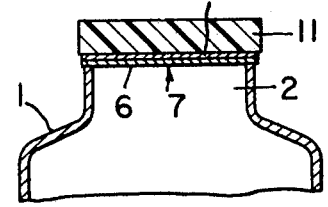

Finally, as indicated in FIG. 3e, the cover 7 in the heat-sealed state is pressed against the opening rim surface 3 by means of a pressing plate 11 to assure the adhesion between the resin layer 6 and the rim surface 3. This pressing plate 11 has the function of holding the heat-seal layer 6 until it acquires ample adhesive strength as it is cooled by the pressing plate 11. The pressing plate 11 is preferably made entirely of a rubber-like material or provided at least as a surface layer with a rubber-like cushion layer of a thickness of at least 0.5 mm which is ample for absorbing the aforementioned projections on the rim surface 3 of the glass container 1.

The pressing of the cover 7 with this pressing plate 11 can be carried out effectively with a pressing force of 1.0 to 5.0 kg/cm$^2$, with a surface temperature of the pressing plate 11 of room temperature to 90° C., which is 140° C. or more lower than that of the heating plate 9, and with a pressing time of 0.5 to 4.0 seconds.

By this pressing step, the cover 7 is caused to adhere to the opening rim surface 3 with uniform adhesive strength, whereby the adhesive strength after heat sealing can be maintained at a high level for a long time. Furthermore, even if the preceding heat-sealing step has been inadequate and a portion of the cover 7 has separated from the rim surface 3, the sealing of the lid material 7 can be positively accomplished by this pressing step.

In order to indicate more fully the nature and utility of this invention, the following specific example of practice of the sealing process according to this invention and related results are set forth, it being understood that this example is presented as illustrative only and is not intended to limit the scope of the invention.

EXAMPLE

For the cover 7, a laminated sheet material comprising an upper aluminum foil 5a of 50-micron thickness, a lower sealant layer 6 of 70-micron thickness of a sealant resin prepared by graft polymerizing maleic acid onto a 50-percent saponified EVA (vinyl acetate content being 30% by weight), the quantity of the maleic acid being 3% by weight of the partially saponified EVA, and a polyethylene layer 5b of 15-micron thickness interposed between the foil 5a and the layer 5b was used.

A glass container (jar) 1 was then filled with a food-product content (i.e., jam) at 90° C., and its opening rim surface 3 was heated to a temperature of 60° C. by means of a metal preheating plate.

Next the cover 7 was placed on the opening rim surface 3 and was pressed against and heat sealed to the rim surface 3 under the conditions of a pressing time of 3 seconds and a pressure of 2.0 kg/cm$^2$ by means of a heating plate at a temperature of 280° C.

In addition, the cover 7 was thereafter pressed against the rim surface 3 by means of a pressing plate 11 made of a silicone rubber of 2.0 mm thickness and a rubber hardness of 40 Rockwell (Shore A) under the conditions of a pressure of 2.0 kg/cm$^2$, pressing time of 3 seconds, and surface temperature of the pressing plate of 60° C.

The glass container heat sealed in the above described manner was found to be sealed with stable adhesiveness with an interior degree of vacuum of 40 cmHg, and its pressure withstanding strength was 0.3 kg/cm$^2$. Furthermore, this heat-sealed glass container was stored under refrigeration at a temperature of 7° C., and measurements were carried out, whereupon no decrease in adhesive strength in relation to the initial value was observable.

In a related experiment, the above described heat-sealing process was carried out with a solid content product in place of a fluid content. As a result, it was found that the glass container could be amply sealed.

It will be seen from the above description that, by the practice of the process of this invention for sealing the lid material of a glass container, a cover can be positively sealed on a glass container with high reliability even in the case where the glass container is filled with a liquid substance in a high-temperature state. Moreover, this heat-sealing process can be carried out without the necessity of using a high-cost and complicated apparatus as in the induction sealing process.

What is claimed is:

1. Process for affixing covers onto glass containers which comprises the steps of:
    (a) providing a glass container having an opening end;
    (b) providing a cover comprising a piece of metal foil having a shape suitable for covering said opening end and a sealant layer of a thermoplastic resin laminately secured to one surface of the metal foil;
    (c) preheating the opening end of said glass container;
    (d) placing the cover on the opening end so that the sealant layer contacts the opening end;
    (e) pressing the cover, as it is heated, against the opening end by means of a heating plate having a cushioning layer provided on the part of the heating plate which contacts the cover thereby to cause the cover to adhere to the opening end of the glass container through the heating of the sealing thermoplastic resin so that said sealant is in an adhesive state; and
    (f) pressing the cover against the opening end of the glass while said sealant is in an adhesive state by means of a pressing plate at a temperature lower than that of the heating plate in step (e) so as to cool said sealant thereby assuring positive sealing of the opening end by the cover;
    said heating plate means of step (e) and pressing plate means of step (f) being entirely separate means.

2. A process according to claim 1 in which the sealant layer of the cover comprises a graft copolymer produced by graft-polymerizing an unsaturated carboxylic acid onto a partially saponified product of an ethylene/vinyl acetate copolymer.

3. A process according to claim 1 in which the opening end of the container is preheated to 40° to 90° C.

4. A process according to claim 3 in which the surface temperature of the heating plate is 230° to 350° C.

5. A process according to claim 1 in which a cushioning layer of a thickness of 2 to 10 mm is provided on the part of the heating plate to contact the cover.

6. A process according to claim 1 in which at least the surface layer of the press plate to contact the cover has a cushioning characteristic.

7. A process according to claim 1 in which the surface temperature of the pressing plate in step (f) is in the range of room temperature to 90° C.

8. A process according to claim 7 in which the pressure applied by the pressing plate is 1.0 to 5.0 kg/cm$^2$, which is applied for 0.5 to 4.0 seconds.

9. A process according to claim 1 in which the glass container contains a food product.

10. A process according to claim 1 in which the glass container contains a heated food product in liquid state.

* * * * *